(12) United States Patent
Ahmed et al.

(10) Patent No.: US 12,425,873 B1
(45) Date of Patent: Sep. 23, 2025

(54) METHOD FOR MANAGING COVERAGE AND INTERFERENCE OF INTERNET OF DRONES (IOD)

(71) Applicant: King Fahd University of Petroleum and Minerals, Dhahran (SA)

(72) Inventors: Gamil Abdullah Mohsen Ahmed, Dhahran (SA); Tarek Rahil Omar Sheltami, Dhahran (SA); AnsarUlHaque Yasar, Lubbeek (BE)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/247,329

(22) Filed: Jun. 24, 2025

Related U.S. Application Data

(60) Provisional application No. 63/741,751, filed on Jan. 3, 2025.

(51) Int. Cl.
*H04W 16/18* (2009.01)
*H04B 7/185* (2006.01)

(52) U.S. Cl.
CPC ........ *H04W 16/18* (2013.01); *H04B 7/18502* (2013.01)

(58) Field of Classification Search
CPC ................ B64U 2101/20; B64U 10/00; B64U 2201/00; B64U 2201/20; B64U 2201/10;
(Continued)

(56) References Cited

U.S. PATENT DOCUMENTS 9,692,498 B2 * 6/2017 Fan ........................ H04W 4/023
9,853,713 B2 * 12/2017 Jalali .................. H04B 7/18502
(Continued)

FOREIGN PATENT DOCUMENTS

CN 113490179 A 10/2021
CN 113784366 B 4/2023
(Continued)

OTHER PUBLICATIONS

Dazhong MA, et al., "An Optimal Three-Dimensional Drone Layout Method for Maximum Signal Coverage and Minimum Interference in Complex Pipeline Networks", IEEE Transactions on Cybernetics, vol. 52, Issue 7, Jan. 5, 2021, pp. 5897-5907, Abstract Only, 1 page.

*Primary Examiner* — Matthew C Sams
(74) *Attorney, Agent, or Firm* — Oblon, McClelland, Maier &Neustadt, L.L.P.

(57) ABSTRACT

A method of maximizing coverage and minimizing interference in an Internet of Drones (IoD) network with multiple drones is provided. The method includes obtaining input parameters such as radio frequency parameters, drone locations, velocities, coverage areas, and the number of drones. A multi-objective model determines an initial interference and coverage based on these parameters. The iterative process continues for a predetermined time to identify the drone locations that achieve maximum coverage while minimizing interference. The approach accounts for beam angles, antenna configurations, and carrier frequencies, ensuring efficient IoD deployment. By leveraging a radio frequency-based determination model, the method dynamically adjusts drone positions to enhance network performance. The solution effectively balances coverage and interference, facilitating reliable communication in drone-based networks.

19 Claims, 15 Drawing Sheets

(58) Field of Classification Search
CPC .... B64U 10/14; B64U 20/80; B64U 2101/30; B64U 2201/102; B64U 2201/104; B64U 50/19; H04B 7/18504; H04B 7/2606; H04B 7/18506; H04B 7/18502; H04B 17/391; H04W 16/26; H04W 16/18; H04W 84/06; H04W 84/18; H04W 24/02; H04W 36/083; H04W 84/005; H04W 36/0061; H04W 4/40; H04W 4/44; H04W 40/12; H04W 72/04; H04W 72/541; H04W 72/542; H04W 88/08; H04W 24/04; H04W 24/08; H04W 24/10; H04W 36/008375; H04W 36/304; H04W 36/322; H04W 36/328; H04W 4/02; H04W 4/023; H04W 4/029; H04W 4/30; H04W 4/42; H04W 64/003; H04W 64/006; H04W 72/51; H04L 41/145; H04L 43/0888; H04L 43/16; G06N 20/00

See application file for complete search history.

(56) References Cited

U.S. PATENT DOCUMENTS

| | | | |
|---|---|---|---|
| 9,918,234 B2 * | 3/2018 | Zerick | H04W 64/003 |
| 9,980,267 B2 * | 5/2018 | Jalali | H04W 16/26 |
| 10,034,209 B1 * | 7/2018 | Nandan | H04W 36/0061 |
| 10,321,461 B2 * | 6/2019 | Jalali | H01Q 1/28 |
| 10,389,432 B2 * | 8/2019 | De Rosa | G08G 5/32 |
| 11,683,859 B2 * | 6/2023 | Kanitkar | H04L 43/0888 370/329 |
| 11,763,683 B2 * | 9/2023 | Neubauer | H04W 36/328 701/120 |
| 12,230,150 B2 * | 2/2025 | Melodia | G08G 5/26 |
| 2017/0013476 A1 * | 1/2017 | Suthar | H04W 72/51 |
| 2017/0013478 A1 * | 1/2017 | Singh | H04B 7/18506 |
| 2017/0126309 A1 * | 5/2017 | Rupasinghe | B64U 10/00 |
| 2019/0222297 A1 * | 7/2019 | Vos | H04W 24/02 |
| 2021/0282224 A1 * | 9/2021 | Kanitkar | H04L 43/0888 |
| 2022/0045747 A1 * | 2/2022 | De Rosa | H04B 7/18506 |
| 2022/0189320 A1 * | 6/2022 | Melodia | G08G 5/26 |
| 2023/0069579 A1 * | 3/2023 | Al Tamimi | H04W 16/26 |
| 2023/0422048 A1 * | 12/2023 | Panda | H04W 16/18 |

FOREIGN PATENT DOCUMENTS

| | | | | |
|---|---|---|---|---|
| CN | 117858103 A | | 4/2024 | |
| CN | 118368641 A | * | 7/2024 | ......... H04B 7/18504 |
| GB | 2628115 A | * | 9/2024 | ............ H04W 84/18 |

* cited by examiner

METHOD FOR MANAGING COVERAGE AND INTERFERENCE OF INTERNET OF DRONES (IOD)

CROSS-REFERENCE TO RELATED APPLICATIONS

The present application claims priority to U.S. Provisional Application No. 63/741,751, filed Jan. 3, 2025, the entire content of which is incorporated by reference herein in its entirety for all purposes.

STATEMENT OF PRIOR DISCLOSURE BY AN INVENTOR

Aspects of the present disclosure were described in Sheltami, T., Ahmed, G., & Yasar, A. An Optimization Approach of IoD Deployment for Optimal Coverage Based on Radio Frequency Model. *CMES—Comput. Model. Eng. Sci.* 139, 2627-2647 (2024), incorporated herein by reference in its entirety.

STATEMENT OF ACKNOWLEDGEMENT

Support provided by the Interdisciplinary Center of Smart Mobility and Logistics under project INML2104 at King Fahd University of Petroleum and Minerals (KFUPM), and the Special Research Fund (BOF) under Grant BOF23KV17 at Hasselt University, is gratefully acknowledged.

BACKGROUND

Technical Field

The present disclosure is directed to an autonomous decision-making approach for deployment of UAV-assisted Internet of Drones (IoD) networks using an intelligent algorithm.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Unmanned Aerial Vehicles (UAVs) have gained significant attention in recent years due to their potential to provide various services, including wireless communication coverage, surveillance, disaster management, and environmental monitoring. The integration of UAVs into wireless communication networks has opened new possibilities for enhancing network performance and expanding coverage, especially in areas with limited infrastructure or during emergency situations. UAV-assisted networks can act as aerial base stations or relays to provide seamless wireless connectivity and improve service quality.

The Internet of Drones (IoD) can function efficiently by enabling UAVs to work together in a coordinated manner to achieve shared goals. The IoD supports a variety of applications within wireless networks, such as improving wireless capacity and coverage in hotspots or temporary events like outdoor gatherings by deploying aerial base stations. Additionally, the IoD plays a crucial role in disaster relief efforts, offering communication support in scenarios where traditional terrestrial networks fail. The IoD can also gather data by navigating an area, pinpointing object locations, and providing real-time topological information. In disaster situations, the IoD formations use image capture and analysis tools to create accurate representations of affected zones, facilitating the rescue of humans and animals during emergencies. Moreover, the IoD is extensively used in environmental monitoring, covering applications like search and rescue missions and surveillance activities using cameras and sensors. A notable example is the deployment of UAV swarms for traffic monitoring in smart cities, as illustrated in FIG. 1. Numerous approaches have been proposed to study the deployment of the IoD for coverage problems. However, such deployment poses a daunting challenge. The interference between nodes within a network can significantly impact its performance, leading to corruption, data loss, retransmissions and increased latency. Another challenge is the deployment altitude. Although deploying the IoD at a high altitude offers improved LOS conditions, the deployment also results in an increased distance between the IoD network and ground vehicles, leading to higher path loss.

The adoption of UAV-assisted Internet of Things (IoT) networks further amplifies the utility of UAVs by enabling connectivity for a wide range of IoT devices deployed in remote or disaster-affected areas. The networks can facilitate applications such as smart agriculture, environmental sensing, search and rescue operations, and temporary communication services. However, the effective deployment of UAVs in such networks poses several technical and operational challenges.

One of the primary challenges in UAV-assisted networks is the optimal placement of UAVs to maximize coverage while minimizing interference and energy consumption. The dynamic nature of wireless environments, coupled with varying user demands and terrain characteristics, makes it difficult to determine the optimal locations for UAVs. Traditional approaches for UAV deployment often rely on fixed or predefined placement strategies, which may not be adaptive to dynamic environments or fluctuating user distributions. The above mentioned limitation can result in suboptimal coverage, inefficient resource utilization, and degraded network performance.

To overcome the challenges, various optimization-based methods have been proposed to address the UAV placement problem. The methods leverage mathematical models and algorithms to determine the best possible UAV positions based on predefined objectives such as coverage maximization, interference minimization, or energy efficiency. For example, Particle Swarm Optimization (PSO) is a widely used algorithm that mimics the collective behavior of a swarm to find optimal solutions. However, conventional PSO approaches may suffer from slow convergence, limited exploration capabilities, and susceptibility to local optima, particularly in complex search spaces.

Game-theoretic approaches have also been explored for UAV deployment, where UAVs are modeled as players in a strategic game. The above approaches aim to capture the competitive or cooperative interactions among UAVs to optimize coverage and resource allocation. However, game-theoretic approaches can be computationally intensive, especially in large-scale networks, and may not always guarantee globally optimal solutions due to the decentralized decision-making process.

Another approach, known as Coverage and Void Avoidance Cellular Automata (CVACA), attempts to maximize coverage by adjusting the sensing radius of each UAV while avoiding overlaps with neighboring UAVs. The CVACA can quickly achieve coverage in smaller networks by iteratively updating the UAV positions based on local interactions. However, the method becomes less efficient as the number of the UAVs increases, leading to higher computational complexity, slower convergence, and increased communication overhead.

Despite the advancements in optimization and game-theoretic methods, existing approaches still face challenges in achieving fast convergence, global optimality, scalability, and adaptability in large and dynamic UAV networks. The highly dynamic nature of wireless environments and varying user demands necessitate the development of autonomous decision-making frameworks that can efficiently dispatch the UAVs to appropriate locations, maximize coverage, and minimize interference in real-time.

Therefore, there is a need for efficient IoD deployment to address the challenges associated with area coverage and to achieve an optimal coverage with minimal interference.

SUMMARY

In an exemplary embodiment, a method is described for simultaneously maximizing a coverage and minimizing an interference of an Internet of Drones (IoD) network including a plurality of drones. The method includes obtaining a plurality of input parameters. The plurality of input parameters includes radio frequency parameters, including a beam angle of an antenna of each drone of the plurality of drones, a number of antennae for each drone of the plurality of drones, and a carrier frequency. The input parameters also include a location of each drone of the plurality of drones, a velocity of each drone of the plurality of drones, a coverage area, and a number of drones of the plurality of drones. The plurality of input parameters is initialized based on an input condition. The method further includes determining a first interference and a first coverage based on the plurality of input parameters using a radio frequency-based multi-objective model. The plurality of input parameters is updated to obtain a plurality of updated parameters. A second interference and a second coverage are determined based on the plurality of updated parameters and the radio frequency-based multi-objective model. A best coverage is determined by comparing the first coverage and the second coverage, and a best interference is determined by comparing the first interference and the second interference. The method iterates the updating, determining an updated interference and an updated coverage, and determining the best coverage and the best interference by a predetermined time to determine a best location of each drone of the plurality of drones with the best coverage and the best interference.

In some embodiments, the step of determining the second coverage further includes determining the second interference of the IoD network based on the plurality of input parameters. It also includes determining a coverage probability based on the second interference. A plurality of block coverages is determined based on the coverage probability. The second coverage is determined based on the plurality of block coverages.

In some embodiments, each drone of the plurality of drones includes a fixed beam directional antenna.

In some embodiments, the fixed beam directional antenna is configured for a line-of-sight propagation and a non-line of sight propagation. In some embodiments, the determined first coverage is based on the line-of-sight propagation and the non-line of sight propagation.

In some embodiments, the plurality of input parameters includes an altitude of each drone of the plurality of drones.

In some embodiments, the method further includes adjusting the altitude of each drone of the plurality of drones to adjust the line-of-sight propagation and the non-line of sight propagation.

In some embodiments, the plurality of input parameters further includes a weather condition, a regulatory constraint, and an energy consumption of the plurality of drones.

In some embodiments, the method further includes deploying the plurality of drones at the determined best location of each drone of the plurality of drones.

In some embodiments, the method further includes adjusting a beamwidth of the antenna to adjust the first coverage.

In some embodiments, the method further includes adjusting an orientation of the antenna to adjust the first coverage.

In some embodiments, the plurality of input parameters further includes terrain elevation, building density, and vegetation attenuation.

In some embodiments, the method further includes performing a simulation to assess a deployment of the plurality of drones at the determined best location of each drone of the plurality of drones.

In some embodiments, the method further includes repeating the iterating, the updating, determining an updated interference and an updated coverage, and determining the best coverage and the best interference upon determining, based on the simulation, that the deployment of the plurality of drones at the determined best location of each drone of the plurality of drones does not provide the best coverage above a predetermined threshold.

In some embodiments, the predetermined threshold is an alternative coverage determined using a game-based strategy.

In some embodiments, the predetermined threshold is an alternative coverage determined using a Collaborative Visual Area Coverage Approach (CVACA).

In some embodiments, the method further includes adjusting a transmission power of each drone of the plurality of drones based on the determined first interference.

In some embodiments, the adjusting the transmission power of each drone of the plurality of drones based on the determined first interference reduces the best interference of each drone of the plurality of drones.

In some embodiments, the determined best location of each drone of the plurality of drones maximizes a horizontal separation distance between each drone of the plurality of drones.

In some embodiments, the plurality of input parameters further includes a number of cells and a cell size. The method further includes maximizing the best coverage per cell based on the number of cells and the cell size.

In another exemplary embodiment, the foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
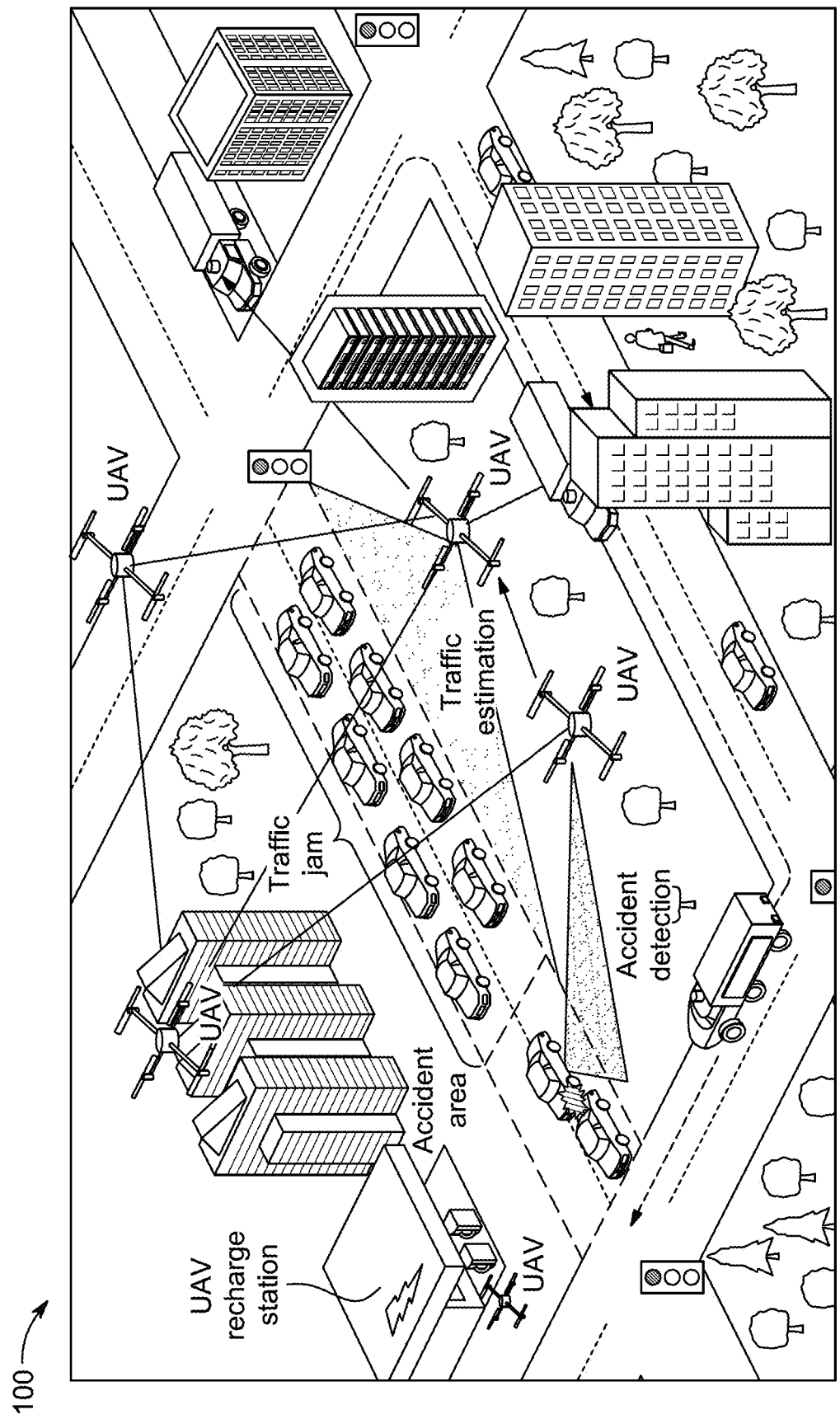
FIG. 1 illustrates an exemplary representation of a UAVs swarm deployment for traffic monitoring in a smart city, according to prior art.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The disclosure provides a method for simultaneously maximizing coverage and minimizing interference in an Internet of Drones (IoD) network comprising a plurality of drones. The present disclosure leverages a radio frequency-based multi-objective model to dynamically determine the optimal location of each drone based on various input parameters such as radio frequency characteristics, drone location, velocity, and coverage area. The disclosure iteratively updates the input parameters to achieve the best coverage while mitigating interference in dynamic environments. The disclosure further includes adjusting drone altitude, antenna beamwidth, orientation, and transmission power to optimize coverage performance. Additionally, the present disclosure supports simulation-based assessments and alternative coverage strategies to enhance deployment accuracy and scalability.

In various aspects of the disclosure, non-limiting definitions of one or more terms that will be used in the document are provided below.

A term "Internet of Drones (IoD)" refers to a network of unmanned aerial vehicles (UAVs) that communicate and collaborate to perform tasks such as surveillance, delivery, and coverage optimization in a given area.

A term "Particle Swarm Optimization (PSO)" refers to a population-based optimization algorithm inspired by the social behavior of birds and fish, used to find optimal solutions in multi-dimensional search spaces.

A term "Improved Particle Swarm Optimization (IPSO)" refers to an enhanced version of PSO that increases convergence speed and prevents entrapment in local optima to achieve a more accurate global optimum.

A term "Radio Frequency model (RF model)" refers to the communication parameters of drones, including antenna beam angles, carrier frequency, and interference considerations, to optimize coverage and minimize signal degradation.

A term "Coverage Probability (Pcov)" refers to the likelihood that a given area is within the effective signal range of at least one UAV, determined by factors such as altitude, transmission power, and interference.

A term "Interference" refers to the disruption in signal transmission caused by overlapping frequencies from multiple UAVs, which can degrade communication quality and reduce coverage efficiency.

A term "Objective Function (Obj_Fun)" refers to the mathematical function used to evaluate and optimize the performance of an IoD network, typically based on parameters such as coverage probability and interference minimization.

The present disclosure provides a method for optimizing the deployment of drones in an Internet of Drones (IoD) network by simultaneously maximizing coverage and minimizing interference. The IoD network includes a plurality of drones equipped with antenna systems that enable wireless communication for various applications such as surveillance, communication relays, and disaster management. The deployment of drones in the IoD network plays a crucial role in ensuring seamless connectivity and efficient data transmission across a specified coverage area.

One of the objectives of the method is to dynamically adjust the location and operational parameters of each drone to achieve optimal network performance. The method determines the best location of each drone by iterating through multiple configurations of input parameters, such as radio frequency parameters, drone velocity, and environmental conditions. The disclosure utilizes a radio frequency-based multi-objective model that calculates both coverage and interference to guide the iterative optimization process. By continuously updating and evaluating the network parameters, the method identifies the best locations of the drones where the coverage is maximized, and the interference is minimized.

The disclosure addresses several challenges associated with the deployment of drones in the IoD network. One significant challenge is the dynamic nature of the network, where the positions and velocities of the drones change over time. Additionally, the presence of obstacles, terrain variations, and weather conditions affects the signal propagation and coverage quality. The disclosure also tackles the problem of interference caused by multiple drones operating on the same frequency bands. The method of the disclosure considers these challenges by incorporating diverse input parameters and iterative optimization techniques to improve the overall network performance.

The present disclosure provides a comprehensive solution for the efficient deployment of drones in the IoD network, ensuring balanced coverage and reduced interference across the coverage area.

Figure 2:
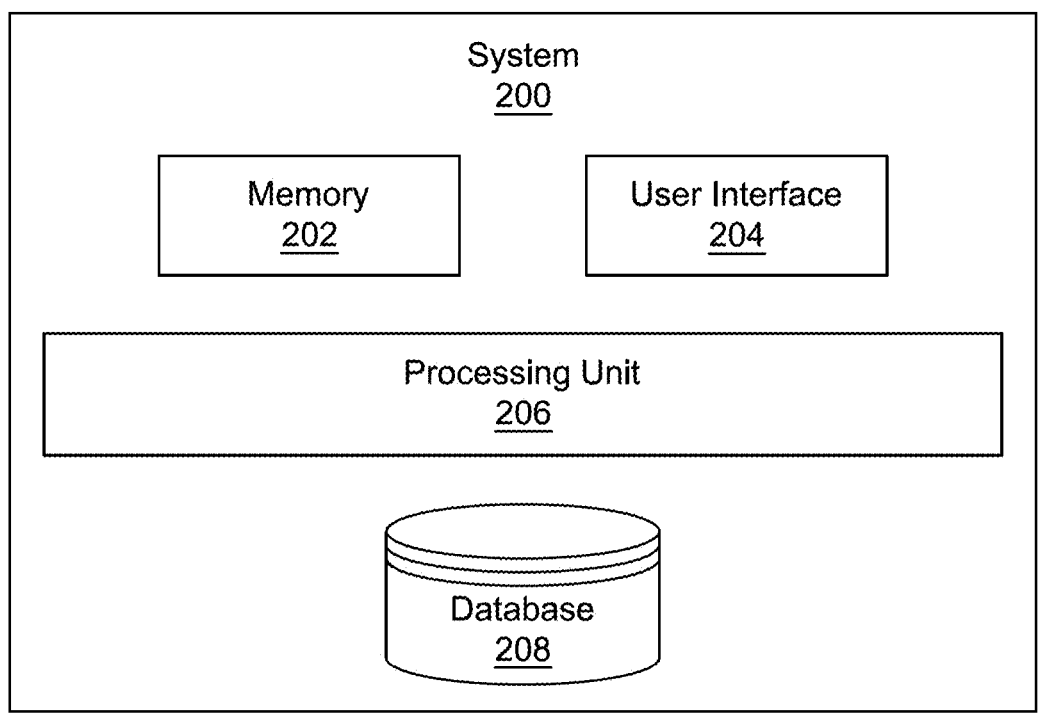
FIG. 2 illustrates an exemplary operational workflow of a system of simultaneously maximizing a coverage and minimizing an interference of an internet of drones (IoD) network including a plurality of drones, according to an embodiment of the present invention.

FIG. 2 illustrates an exemplary representation of a system 200 of simultaneously maximizing a coverage and minimizing an interference of an internet of drones (IoD) network including a plurality of drones, according to one or more aspects of the present disclosure.

The system 200 comprises a memory 202, a user interface 204, a processing unit 206 (or processing circuitry 206) and a database 208.

Referring to FIG. 2, in an embodiment, the system 200 includes the processing unit 206. The processing unit 206 may be implemented as one or more microprocessors, microcomputers, microcontrollers, digital signal processors, central processing units, logic circuitries, and/or devices that process data based on operational instructions. Among other capabilities, the processing unit 206 may be configured to fetch and execute computer-readable instructions stored in the memory 202 of the system 200. The memory 202 may be configured to store one or more computer-readable instructions or routines in a non-transitory computer-readable storage medium, which may be fetched and executed to create or share data packets over a network service. The memory 202 may comprise any non-transitory storage device including, for example, volatile memory such as random-access memory (RAM), or non-volatile memory such as erasable programmable read-only memory (EPROM), flash memory, and the like.

In an embodiment, the system 200 may include the user interface 204. The user interface 204 may comprise a variety of interfaces, for example, interfaces for data input and output devices (I/O), storage devices, and the like. The user interface 204 may facilitate communication through the system 200. The user interface 204 may also provide a communication pathway for one or more components of the system 200. Examples of such components include, but are not limited to, the processing unit 206 and the database 208.

Figure 3:
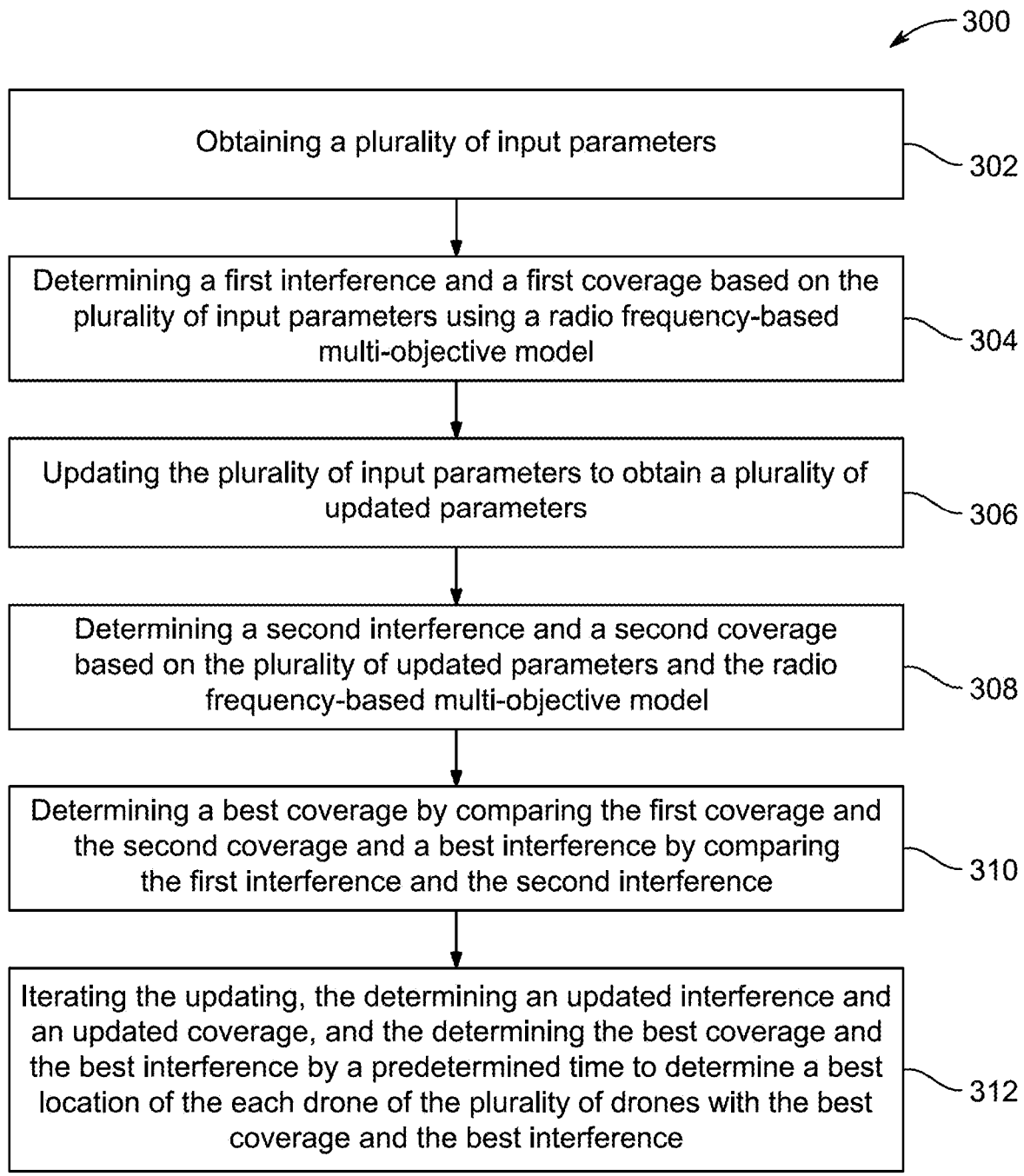
FIG. 3 illustrates a process flow for a method of simultaneously maximizing the coverage and minimizing the interference of the IoD network including the plurality of drones, according to certain embodiments.

FIG. 3 illustrates an exemplary representation of a method 300 of simultaneously maximizing the coverage and minimizing an interference of an internet of drones (IoD) network including the plurality of drones, according to one or more aspects of the present disclosure.

FIG. 3 should be read in conjunction with FIG. 2, as the system 200 illustrated in FIG. 2 implements the method 300 depicted in FIG. 3 to perform the disclosure.

A first step 302 is obtaining, by the processing unit 206, a plurality of input parameters including radio frequency parameters. The plurality of input parameters plays a critical role in determining the performance of the Internet of Drones (IoD) network. The input parameters encompass various aspects of the IoD network and are categorized into radio frequency parameters, location and velocity parameters, environmental conditions, and operational constraints. The plurality of input parameters is obtained as the first step 302 in the method 300, where the input parameters are initialized based on an input condition. The input condition refers to the predefined criteria or constraints used to initialize the plurality of input parameters on the IoD network. The input condition defines the initial values for radio frequency parameters, location and velocity parameters, environmental conditions, and operational constraints. These values serve as the foundation for determining the performance of the IoD network and influence the subsequent iterative process in the method 300.

The radio frequency parameters include the beam angle of an antenna of each drone of the plurality of drones, a number of antennae for each drone of the plurality of drones, and a carrier frequency. The radio frequency parameters further include a beamwidth of the antenna, which can be adjusted to modify coverage, and an orientation of the antenna, which can be adjusted to modify coverage. Additionally, a transmission power of each drone of the plurality of drones is included as a radio frequency parameter, where the transmission power is adjusted based on interference to reduce interference.

The location and velocity parameters include the location of each drone of the plurality of drones and the velocity of each drone of the plurality of drones. The location and velocity parameters further include an altitude of each drone of the plurality of drones, which can be adjusted to influence line-of-sight propagation and non-line-of-sight propagation. The location and velocity parameters also include a horizontal separation distance between the plurality of drones, where the horizontal separation distance is maximized to increase or optimize coverage.

The environmental conditions include a weather condition, which may impact the signal propagation and overall coverage of the IoD network. Terrain elevation, building density, and vegetation attenuation are additional environmental conditions that are taken into consideration to increase coverage and minimize interference.

The operational constraints include a regulatory constraint, which may impose limitations on the deployment and operation of the drones. The operational constraints further include an energy consumption of the plurality of drones, which influences the operational efficiency of the IoD network. Additionally, the operational constraints include a number of cells and a cell size, where the number of cells and the cell size are used to maximize coverage per cell.

The plurality of input parameters serves as the foundation for the radio frequency-based multi-objective model. The model dynamically updates the input parameters through iterative processes to iteratively determine the best location of each drone while balancing coverage and interference. The detailed consideration of input parameters enables the IoD network to adapt to changing environmental and operational conditions, ensuring optimal performance in dynamic scenarios.

In step 304, a radio frequency-based multi-objective model is utilized to determine, by the processing unit 206, a first coverage and a first interference of the IoD network based on the plurality of input parameters. The radio frequency-based multi-objective model provides a comprehensive approach to determine the spatial deployment of drones while accounting for radio frequency propagation characteristics. The primary objective of the radio frequency-based multi-objective model is to maximize the coverage area while simultaneously minimizing the interference among the plurality of drones, thereby enhancing the overall network performance.

The radio frequency-based multi-objective model begins by determining an initial interference and an initial coverage based on the plurality of input parameters. The initial interference and coverage are derived from the radio frequency parameters, including the beam angle of the antenna of each drone, the number of antennae, and the carrier frequency. The radio frequency-based multi-objective model employs propagation models to predict the signal transmission behavior, considering both line-of-sight and non-line-of-sight propagation scenarios. The line-of-sight model is applied when there is a direct path between the transmitting and receiving drones, whereas the non-line-of-sight model accounts for signal attenuation due to obstacles, such as buildings or vegetation.

The type of antenna used in each drone is considered in the coverage determination, as specified. The fixed beam directional antenna is used to provide focused signal transmission, which improves the coverage area in the desired direction while reducing interference in other directions. The radio frequency-based multi-objective model dynamically adjusts the beamwidth and orientation of the antenna to modify the coverage area. A narrower beamwidth provides higher signal strength over a smaller coverage area, while a wider beamwidth provides broader coverage at the cost of reduced signal strength. The orientation of the antenna is determined to align with the target coverage area, further enhancing the network performance.

The transmission power of each drone is adjusted based on the interference levels. The radio frequency-based multi-objective model reduces the transmission power in areas with high interference to mitigate co-channel interference while increasing the transmission power in areas with low interference to improve coverage. The adaptive power control mechanism enables the IoD network to maintain a balance between coverage and interference under varying operational conditions.

The radio frequency-based multi-objective model operates in an iterative manner, continuously updating the input parameters to determine the coverage and interference over a predetermined time. The iterative process involves evaluating the current coverage and interference levels, adjusting the radio frequency parameters, and re-evaluating the network performance. The dynamic adjustment allows the IoD network to adapt to changing environmental conditions, drone mobility, and user demands, ensuring a consistent and optimal network performance. The radio frequency-based multi-objective model serves as the core mechanism for determining the spatial deployment of drones in the IoD network, providing a robust solution for coverage maximization and interference minimization.

The radio frequency-based multi-objective model used in step 304 is based on radio frequency propagation characteristics that consider UAV-to-ground communication scenarios and the impact of the surrounding environment on signal transmission.

The radio frequency-based multi-objective model accounts for two types of propagation links:

The first propagation link includes both Line-of-Sight (LOS) and Non-Line-of-Sight (NLOS) components, where the signal is transmitted directly between the drone and the user, or with some obstruction from buildings or other objects.

The second propagation link includes diffraction and reflection effects when there is no direct LOS path between the drone and the user, enabling the ground users to receive signals through indirect propagation paths.

Figure 4:
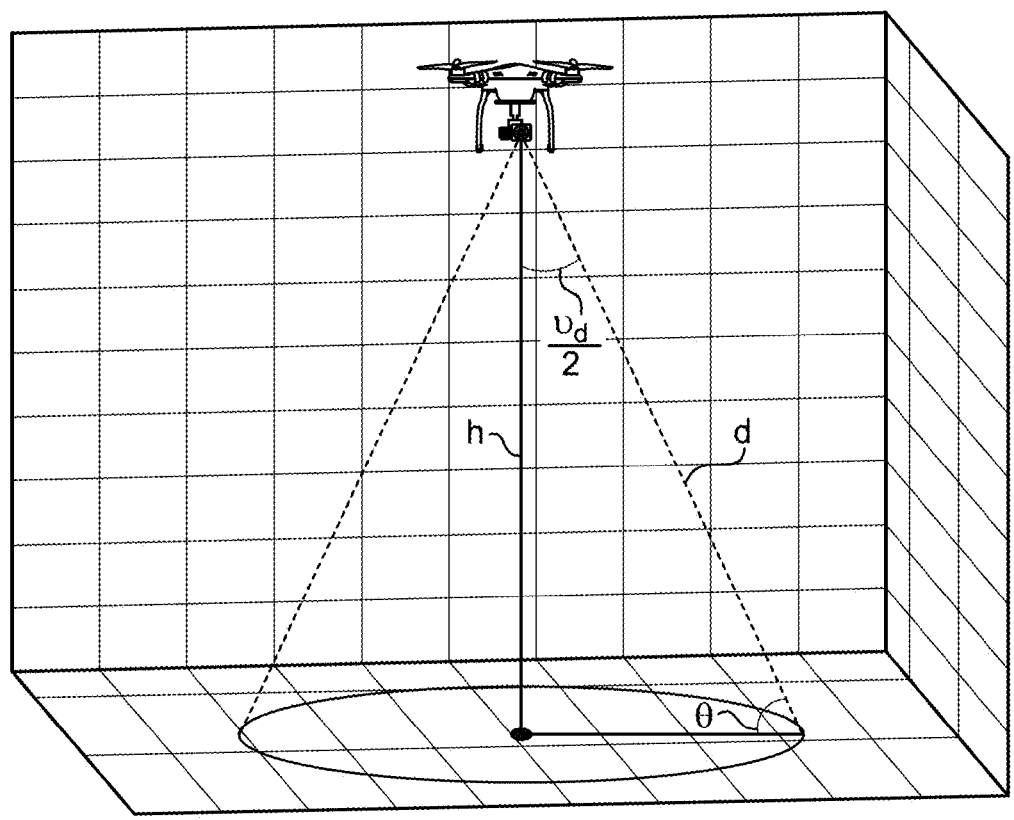
FIG. 4 illustrates a graphical representation of a deployment of the UAV at h altitude, according to certain embodiments.

As shown in FIG. 4, a graphical representation 400 depicting the transmitted signal by UAV is propagated in the space till hitting the urban area, where the signal suffers from scattering and shadowing problems due to buildings and other distributing things in the region. Therefore, the UAV to-ground link suffers from loss. The Doppler shift effect that results from the mobility of UAVs is assumed to be perfectly adjusted. Notably, the UAVs in the target area share comparable attributes such as identical transmission power and are strategically positioned. Each UAV has a directional antenna equipped for sensing tasks, with a fixed beam angle Dd measured in degrees.

The gain can be calculated as follows:

$$\text{Gain} = \begin{cases} \dfrac{29000}{v_d^2} & \dfrac{-v_d}{2} \leq \phi \leq \dfrac{v_d}{2}, \\ \dfrac{1}{\sin^2\left(\dfrac{3\pi}{2\sqrt{(N)}}\right)} & \text{otherwise} \end{cases} ; \quad (1)$$

where $29000/v_d^2$ is the main lobe gain of directional antenna, $$\dfrac{1}{\sin^2\left(\dfrac{3\pi}{2\sqrt{(N_0)}}\right)}$$

is the side lobe gain, $\phi$ is the sector angle, and $N_0$ represents the number of antennas equipped in a drone. The scattering and shadowing effect in NLOS is higher than that in LOS. The received signal power at any user u from drone k can be defined as follows:

$$P_{u,k} = \begin{cases} P_{tx} + G_0 - PLdB - \zeta 1, & \text{LOS link}, \\ P_{tx} + G_0 - PLdB - \zeta 2, & \text{NLOS link}, \end{cases} \quad (2)$$

where $G_0$ is the antenna gain in dB, $P_{tx}$ is the transmitted power and PLdB is the path loss value which can be defined as follows:

$$PL_k = \left(\dfrac{4\pi f_c d_k}{v}\right)^\alpha, \quad (3)$$

where $d_k$ is the distance between $UAV_k$ and user, $f_c$ is the carrier frequency, $\alpha$ is the path loss exponent, v is the speed of light, and $\zeta 1$ and $\zeta 2$ are a shadowing influence in LOS and NLOS with normal distribution of $N(\mu_{LOS},\sigma_{LOS})$, and $N(\mu_{NLOS},\sigma_{NLOS})$, respectively. The variance of this distribution relates to the environment and can be defined based on as follows:

$$\sigma_{LOS} = \alpha_1 e^{-a_2 \theta_k}, \ \sigma_{NLOS} = \beta_1 e^{-\beta_2 \theta_k}, \quad (4)$$

where $\theta_k$ is the elevation angle between drone $_k$ and user, and can be defined as $\theta_k = \sin^{-1}(h/d_k)$, h is the difference altitude between user u and drone k, the parameters α1, α2, β1, and β2 are constant values related to environment. In the light of above definition, the probability of LOS and NLOS can be obtained as follows:

$$P_{LOS} = \alpha \left( \frac{180}{\pi} \theta_k \right)^{\gamma}, \tag{5}$$

where α and γ are constant values related to the environment. As a result of Eq. (5), the probability of NLOS can be written as:

$$P_{NLOS} = 1 - P_{LOS}. \tag{6}$$

In step 306, the method 300 comprises of updating the plurality of input parameters to obtain a plurality of updated parameters by the processing unit 206. The iterative process forms a key component of the method for determining the IoD network. The method progressively improves coverage and minimizes interference by dynamically updating the input parameters and recalculating the coverage and interference values over multiple iterations. The iterative process begins with the initialization of the input parameters based on an input condition. The radio frequency-based multi-objective model determines an initial coverage and interference based on the input parameters.

During each iteration, the radio frequency-based multi-objective model updates the input parameters. The updated parameters include adjustments to the location of the drones, beam angles, transmission power, and antenna orientation to improve coverage and reduce interference. The updated parameters serve as the input for recalculating coverage and interference.

In step 308, based on the updated parameters, the processing unit 206 determines a second interference and a second coverage. The recalculated interference and coverage values represent the performance of the IoD network under the new parameter configuration. The radio frequency-based multi-objective model utilizes the radio frequency-based multi-objective model to calculate the second coverage and the second interference values while accounting for environmental and operational constraints.

The coverage model is responsible for finding the coverage ratio of drones in the target area. The model is also responsible for reflecting the interference effect among UAVs and considers it to determine IoD deployment. It has to be stressed that the interference can be reduced by increasing the distance between drones. In general, signal interference is unavoidable due to the limited distance and frequency channels. Hence, to determine the IoD deployment, the drone signal interference needs to be considered.

Let the projection points of all drones denoted by Pr, and locations of all users in the target area, denoted by Loc be represented as follows:

$$Pr = (pr_1, pr_2, pr_3, \ldots, pr_n). \tag{7}$$

$$Loc = (Loc_1, Loc_2, \ldots, Loc_m);$$

Then, the collection of all users within a coverage radius (CR) of drone i is represented as:

$$S(Loc) = Loc|D(Loc, Pr_i) < = CR, \tag{8}$$

where CR is the coverage radius of drone $_i$, and D(Loc,Pr$_i$) is the distance between Loc and projection point Pr$_i$.

The coverage and interference model can be defined as follows: Let $P_m$ be the minimum received power which can be defined as:

$$P_m = 10\log(\beta N + \beta I), \tag{9}$$

which is a function of signal to interference and noise ratio (β), noise power (N), and the mean interference (I) from the closest drones.

The mean interference effects can be obtained by Eq. (10).

$$f(UAV_i, UAV_j) = Ptx \left( \frac{1}{\sin\left( \frac{3\pi}{2\sqrt{(NO)}} \right)} \right) \tag{10}$$

$$\left( 10^{-\frac{\mu_{LOS}}{10}} * P_{LOSm} + 10^{-\frac{\mu_{NLOS}}{10}} * P_{NLOSm} \right) \times \left( \frac{4\pi f_c d_k}{v} \right)^{-n_0};$$

The total interference in drone i from other drones can be computed as in Eq. (11).

$$\Gamma_{Total} = \sum_{j \in [1, oD]_{j \neq i}} f(UAV_i, UAV_j); \tag{11}$$

The coverage probability can be evaluated by Eq. (12):

$$P_{cov} = P_{LOSk} Q\left( \frac{p_m + PL - pfx - G0 - \mu_{LOS}}{\sigma_{LOS}} \right) + \tag{12}$$

$$P_{NLOSk} Q\left( \frac{p_m + PL - pfx - G0 - \mu_{NLOS}}{\sigma_{NLOS}} \right)$$

From Eq. (12), the coverage probability changes directly as the drone altitude changes due to changing the elevation angle, which in turn changes $P_{LOS}$, $P_{NLOS}$, sensing radius, and distance. It is worth mentioning that flying at high altitudes increases LOS conditions and path loss.

Moreover, the interference increases as drones fly close to each other. Therefore, the transmission power should be adjusted to achieve the best coverage and less interference.

Based on the coverage probability function, the coverage value of each block (b) can be defined by the following formula:

$$Cov_{b,IoD} = \left( 1 - \prod_{k \in IoD} (1 - P_{cov}(b, k)) \right); \tag{13}$$

Then the overall coverage over the whole region is determined using:

$$TCov_{IoD} = \left( \sum_{b \in [1:m]} (Cov_{b,IoD}) \right) \tag{14}$$

The approach of the current disclosure aims to maximize the coverage of a target region by an interconnected IoD network and minimize the interference between adjacent UAVs simultaneously.

Among population-based algorithms, an improved version of PSO implemented is utilized to efficiently dispatch the IoD network into the best location to maximize the coverage of a target region.

In step 310, a best coverage by comparing the first coverage and the second coverage and a best interference by comparing the first interference and the second interference is determined by the processing unit 206. A best coverage by comparing the first coverage and the second coverage and a best interference by comparing the first interference and the second interference is determined. The method compares the first coverage and the first interference values with the corresponding second coverage and the second interference values to evaluate the improvement in network performance. The method evaluates the coverage performance and interference level from two successive iterations. The comparison is based on predefined performance metrics, such as the signal strength distribution, signal-to-interference-plus-noise ratio (SINR), and coverage probability.

The method selects the best coverage by identifying which of the two coverage values provides a higher coverage probability or lower block coverage. The best interference is determined by selecting the interference value that results in minimal interference, thereby improving the overall network quality.

The selection process ensures that the most optimal combination of coverage and interference is carried forward into subsequent iterations, progressively improving the spatial deployment of drones in the IoD network. The comparison mechanism contributes to achieving the best possible balance between maximizing coverage and minimizing interference under varying environmental and operational conditions.

The problem can be formulated as a maximized multi-objective optimization problem as follows:

$$\Gamma_{optinal} = \max \sum\nolimits_{b\in[1:m]}(Cov_{b,IoD}), \quad (15)$$

subject to: $Pr \in R^2$, $HD(Pr_i, Pr_j) > IR$ $i \neq j$, where IR is interference range, $R^2$ is coverage area, and HD is the horizontal distance between projection of $UAV_i$ and $UAV_j$. The constraint in Eq. (16) ensures the projection of all UAVs are inside the coverage area defined by $R^2$. The constraint in Eq. (17) prevents the interference between $UAV_i$ and $UAV_j$.

Algorithm 1: IPSO Algorithm for Optimal Coverage
1: Input
2: MaxIt: maximum iteration
3: PSize: Population Size
4. Bmin, Bmax: Environment Boundary
5. RF: Radio Frequency parameters
6. Output: Best Positions of IoD nodes and Optimal coverage (GBest)
7. INITIALIZATION:
8. initialize c1, c2
9. initialize RF parameters
10. for all (i\in PopSize)
11. initialize position [$Pos_i$], $V_i=0$
12. Coverage$_i$=Obj_Fun ($Pos_i$, RFmodel)
13. if Coverage$_i$>GBest then
14. GBest=Coveragei
15. Update IoD location
16. end if
17. end for
18. repeat
19. iter=0
20. while Iter<Max_It do
21. Update IPSO parameters
22. for all (i∈ PopSize)
23. Update the velocity V (t+1)
24. Update the position $Pos_i$(t+1)
25. Coverage i=Obj_Fun ($Pos_i$ (t+1), RF model)
26. if Coverage$_i$>GBest then
27. GBest=Coverage$_i$
28. Update IoD location
29. end if
30: end for
31: Increment Iter
32: end while
33: until Ideal best is obtained or run out of time
34: return Best IoD location and Optimal Coverage In an embodiment, an Independent Press Standards Organisation (IPSO), is an enhanced version of standard a Press Standards Organisation (PSO) that improves both speed and optimality, preventing entrapment in local optima and enabling the attainment of global optima in a more accurate and efficient manner. The objective function evaluates the generated solution based on the coverage probability function, where the optimal value represents the overall coverage of the target region. The approach of the current disclosure for optimal coverage using IPSO is detailed in Algorithm 1. The initialization phase sets RF and IPSO parameters, including the generation of initial IoD locations. The algorithm then receives environmental constraints such as boundary conditions, cell size (block size), and RF parameters, ultimately determining the optimal coverage. The iterative process updates IPSO parameters, evolves IoD locations, and evaluates coverages for all populations. The best coverage is stored, and IoD locations are updated accordingly. The objective function, Obj_Fun, evaluates coverage by receiving the current IoD node locations and RF model specifications. Interference is computed using Eqs. (10) and (11), coverage probability is determined by Eq. (12), block-level coverage is calculated by Eq. (13), and overall coverage of the area is obtained using Eq. (14).

In step 312, the method 300 iterates the updating, the determining an updated interference and an updated coverage, and the determining the best coverage and the best interference by a predetermined time to determine a best location of each drone of the plurality of drones with the best coverage and the best interference via the processing unit 206. The method 300 performs iteration by repeatedly executing the sequence of updating the plurality of input parameters, determining the updated interference and updated coverage, and comparing the coverage and interference to select the best coverage and best interference, until a predetermined time is reached.

During each iteration, the method 300 updates the plurality of input parameters, such as the location of each drone and carrier frequency, beam angle of the antenna, transmission power, antenna orientation, and horizontal separation distance between drones, to progressively enhance the performance of the IoD network. The updated parameters are recalculated using the radio frequency-based multi-objective model to obtain the updated interference and updated coverage.

The method 300 then performs a comparative analysis between the updated coverage and interference from the current iteration and the best coverage and best interference obtained from previous iterations. The updated parameters are retained as the new best configuration if the updated parameters yield superior network performance.

The iterative process continues over a predetermined time or until a termination condition, such as the convergence of coverage and interference metrics, is met. By iterating the determination process, the method 300 determines the best location of each drone in the IoD network that provides the optimal balance between maximum coverage and minimum interference.

The iterative approach enables the IoD network to dynamically adapt to changes in operational conditions, environmental factors, and network constraints, ensuring optimal spatial deployment of drones across the coverage area.

Experiments

Simulations were performed 100 times, during which normalized coverage and other parameters were calculated. For simplicity and consistency in evaluating coverage performance, coverage was normalized to unity. The simulations were conducted using Matlab on a PC equipped with a CPU running at 2.5 GHz and 3 GB of RAM. Simulation Parameters Settings: The simulation parameters used are summarized in Table 1. The geographical area spans 10,000 m×10,000 m, with ten UAVs randomly placed as initial locations in a square region. The area is divided into 100×100 cells to determine the coverage achieved by each UAV at any given time. It is assumed that prior information about the region is available. The parameters for the communication network are also detailed in Table 1, alongside additional settings based on prior research.

TABLE 1

Parameters settings

| Parameter | Value | Parameter | Value |
|---|---|---|---|
| Geographical range | 10000 m × 10000 m | k1, k2 | 10.39, 0.05 |
| Number of cells | 10000 cells | g1 | 29.06 |
| Frequency | 2 GHz | g2 | 0.03 |
| IoD size | [2, 3, 4, 5, 6, 7, 8, 9, 10] UAVs | Antennas | 16 |
| Speed (v) | 3 × 108 m/s | Trans. power | [15, 20, 25, 30, 40] dBm |
| α | 0.6 | Noise ratio β | 5 |
| γ | 0.11 | Noise power N | −120 dBm |
| n0 | 2.5 | Optimization approach | IPSO |
| μLOS | 1 dBm | Population size | 50 |
| μNLOS | 20 dBm | Maximum iteration | 50 |

Further, the simulation of the coverage problem is carried out over a designated target area without any failures or obstacles obstructing the drones. The effectiveness of the cooperative network of drones is analyzed using the approach of the current disclosure.

The simulation evaluates normalized coverage over multiple iterations with varying numbers of drones, ranging from two to ten UAVs. These UAVs are randomly positioned at a fixed altitude, and their transmission power is set to 30 dBm. FIG. 3 illustrates the results of normalized coverage across different iterations.

The results demonstrate that the coverage area expands as the number of UAVs increases, while maintaining the same transmission power. This highlights the influence of UAV deployment on achieving optimal coverage. However, an increase in the number of UAVs may result in greater interference and overlapping regions. To address this challenge, the interference issue is mitigated by ensuring a sufficient safety distance between drones, which is equal to or greater than the combined sensing radii of the drones.

Figure 5:
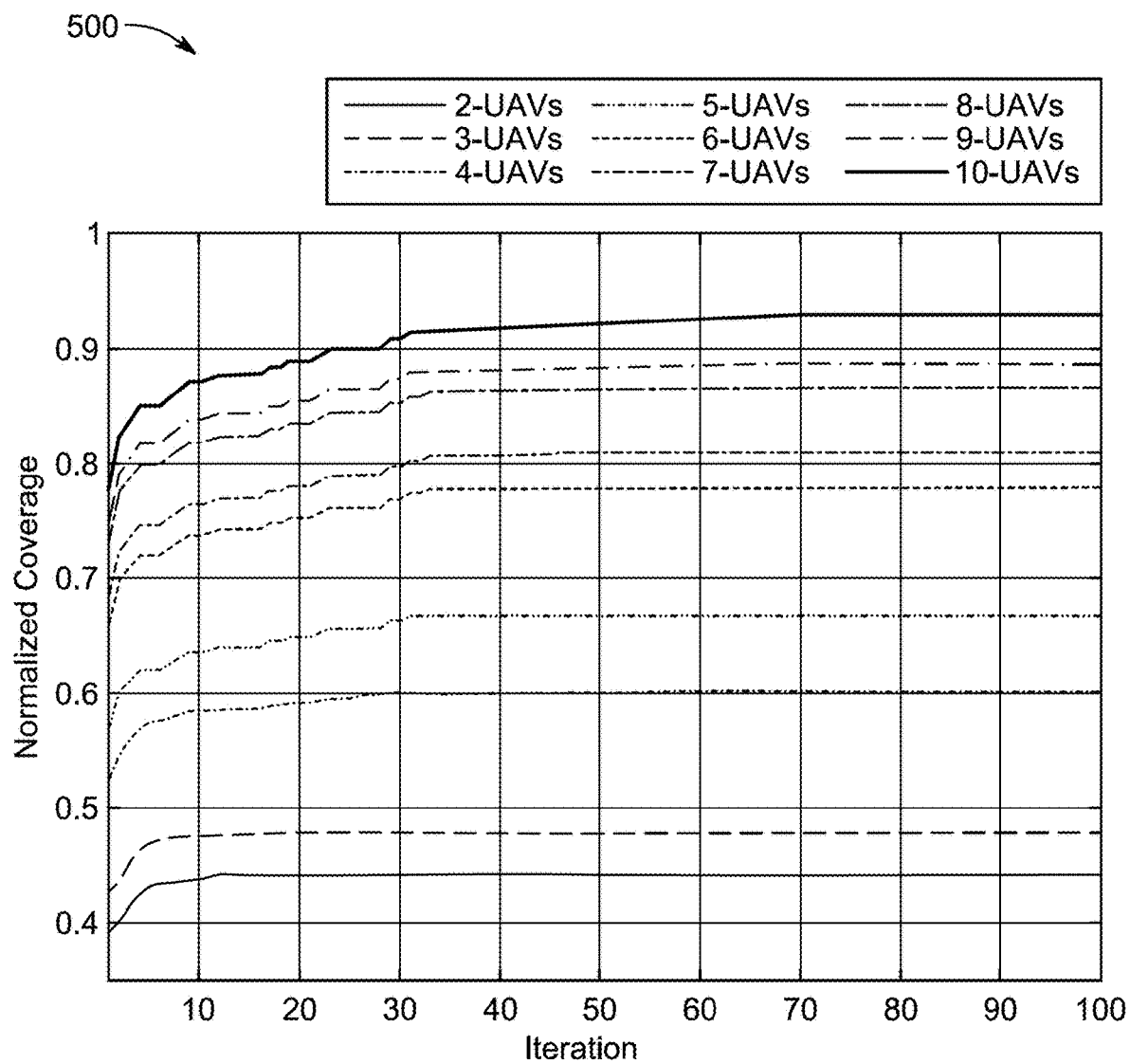
FIG. 5 illustrates a graphical representation of an average normalized coverage with respect to iteration for different IoD sizes, according to certain embodiments.

As shown in FIG. 5, a graphical representation 500 illustrating the coverage improves progressively with each iteration, reaching maximum coverage by the final iteration for all UAVs. Additionally, the figure reveals that the number of iterations required to get a steady state is lower in the case of two UAVs compared to three UAVs and other configurations. However, the scenario involving ten UAVs achieves the highest coverage among all the cases.

Figure 6:
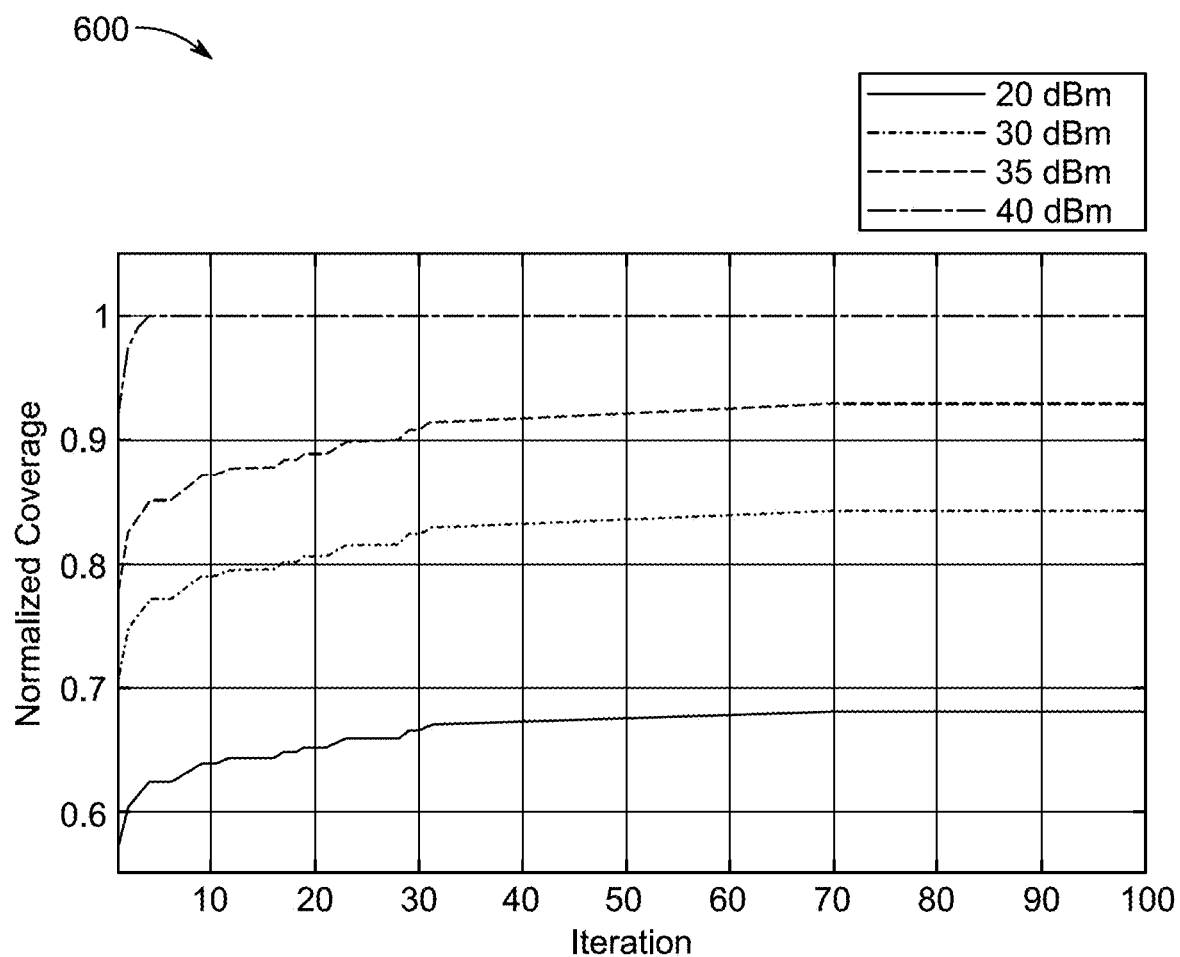
FIG. 6 illustrates a graphical representation of the average normalized coverage with respect to iteration for different transmission power, according to certain embodiments.

The approach of the current disclosure is further analyzed by examining how transmission power affects optimal coverage. FIG. 6 presents a graphical representation 600 illustrating the normalized coverage across iterations with varying transmission power levels, specifically 20, 30, 35, and 40 dBm. The results demonstrate that coverage consistently improves as transmission power increases.

Higher transmission power results in an expanded coverage area, allowing a greater number of users to be included and enhancing overall coverage efficiency. Initially, the coverage is limited, but it steadily increases over successive iterations until it reaches a stable state, indicating maximum achievable coverage.

However, higher transmission power also introduces greater interference between nearby UAVs. To address this issue, it is essential to maintain adequate spacing between UAVs, ensuring the distance between them is at least equal to or greater than the sum of their sensing radii. This precaution helps to minimize interference while maximizing coverage efficiency.

Comparison with Alternative Methods

The disclosed approach has been evaluated against two established methods: the non-game-based CVACA methodology, and the game-based technique. These methodologies were selected for comparison due to their simplicity and ease of implementation when contrasted with other approaches documented in the literature. All three approaches, including the method of the current disclosure, utilize a downward-facing camera, specifically a directional antenna, to achieve the required coverage. Additionally, the variables under consideration for determining a best coverage include the UAV's sector angle and altitude.

The configuration parameters utilized in this comparison are detailed in Table 2. The primary performance metric for evaluation is the maximum normalized coverage as a function of the number of iterations, assessed over 100 iterations. In the simulation, UAVs are distributed randomly within a multilevel network. Each UAV adjusts its location dynamically to maximize overall coverage while minimizing interference with neighbouring UAVs. The process of the present disclosure results in progressively improved normalized coverage over successive iterations until maximum coverage is achieved at the conclusion of the iterative process for all UAVs.

TABLE 2

Compassion parameters settings

| Parameter | Value |
|---|---|
| Geographical range | 10000 m × 10000 m |
| IoD size | [4, 5, 6, 7, 8, 9, 10] UAVs |
| Angle (υd/2) | 45 |

TABLE 2-continued

Compassion parameters settings

| Parameter | Value |
| --- | --- |
| Number of simulation runs | 100 |

Figure 7:
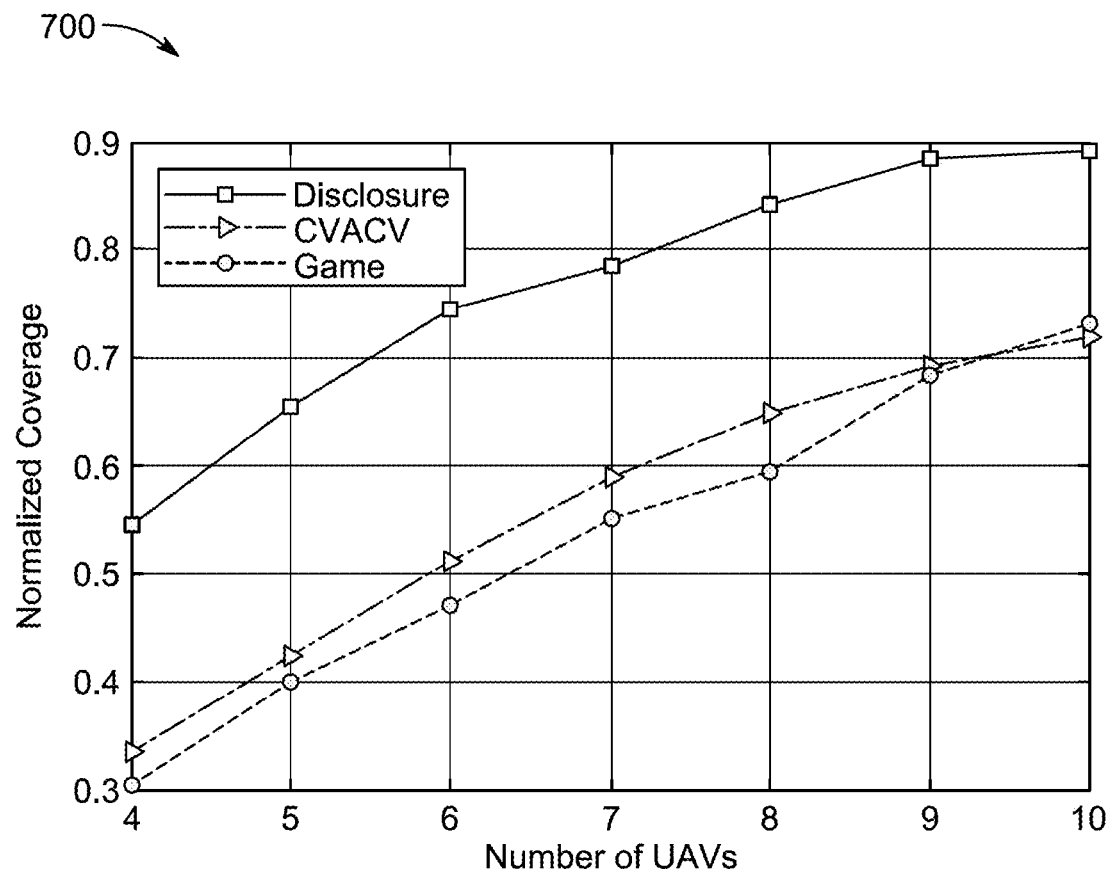
FIG. 7 illustrates a graphical representation of average normalized coverage with respect to number of UAVs and both Coverage and Void Avoidance Cellular Automata (CVACA) and game approaches, according to certain embodiments.
Figure 8:
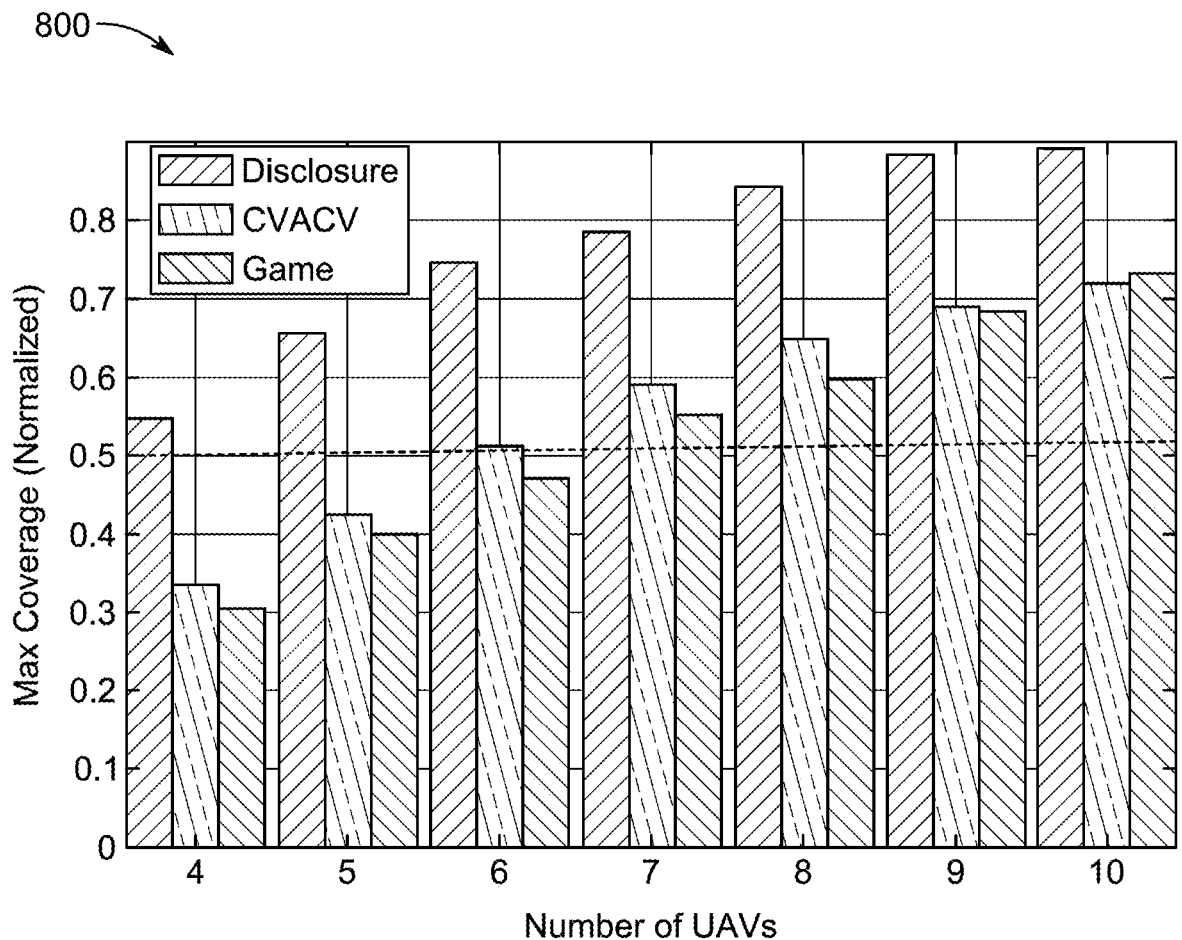
FIG. 8 illustrates a graphical representation of maximum average normalized coverage with respect to number of UAVs of disclosure and both CVACA and game approaches, according to certain embodiments.

The maximum coverage attained by each methodology was recorded, with the results presented in FIGS. 7 and 8. These findings demonstrate the effectiveness of the determination or optimization approach of the current disclosure in achieving superior coverage outcomes compared to the alternative methods under consideration.

As demonstrated in FIG. 7, a graphical representation 700 illustrates that optimal coverage improves progressively as the number of UAVs increases. Initially, the optimal coverage is relatively low when only four UAVs are deployed. However, as the size of the IoD network increases, coverage improves significantly. This enhancement is more pronounced with the determination approach of the current disclosure in comparison to the Coverage and Void Avoidance Cellular Automata (CVACA) and game-based methodologies.

The normalized coverage values, as illustrated in a graphical representation 800 of FIG. 8, for the CVACA and game-based approaches range between [0.33, 0.72] and [0.301, 0.73] for scenarios involving four and ten UAVs, respectively. For scenarios with four and five UAVs, the maximum coverage fails to achieve acceptable values, remaining below 0.5. In such cases, the communication model is unable to meet the required communication demands. On the other hand, for scenarios involving six, seven, eight, nine, and ten UAVs, the normalized coverage exceeds 0.5, which is deemed acceptable in certain practical situations. Notably, the determination approach of the current disclosure achieves normalized coverage exceeding acceptable thresholds across all UAV configurations.

To further analyze the performance of the approach of the current disclosure, the normalized coverage and the number of iterations required to achieve coverage for different UAV configurations are investigated. The results are depicted in a graphical representation 900 depicted in FIG. 9.

The number of iterations required to achieve coverage depends on several factors, including the dimensions of the area being covered and the algorithm employed. The process of determining coverage involves iterative adjustments to the IoD deployment until the desired coverage level is obtained. During each iteration, data is collected regarding the current coverage level, analyzed to identify areas with inadequate coverage, and adjustments are made to improve coverage. The number of iterations serves as a metric to evaluate the efficiency of the algorithm.

Figure 9:
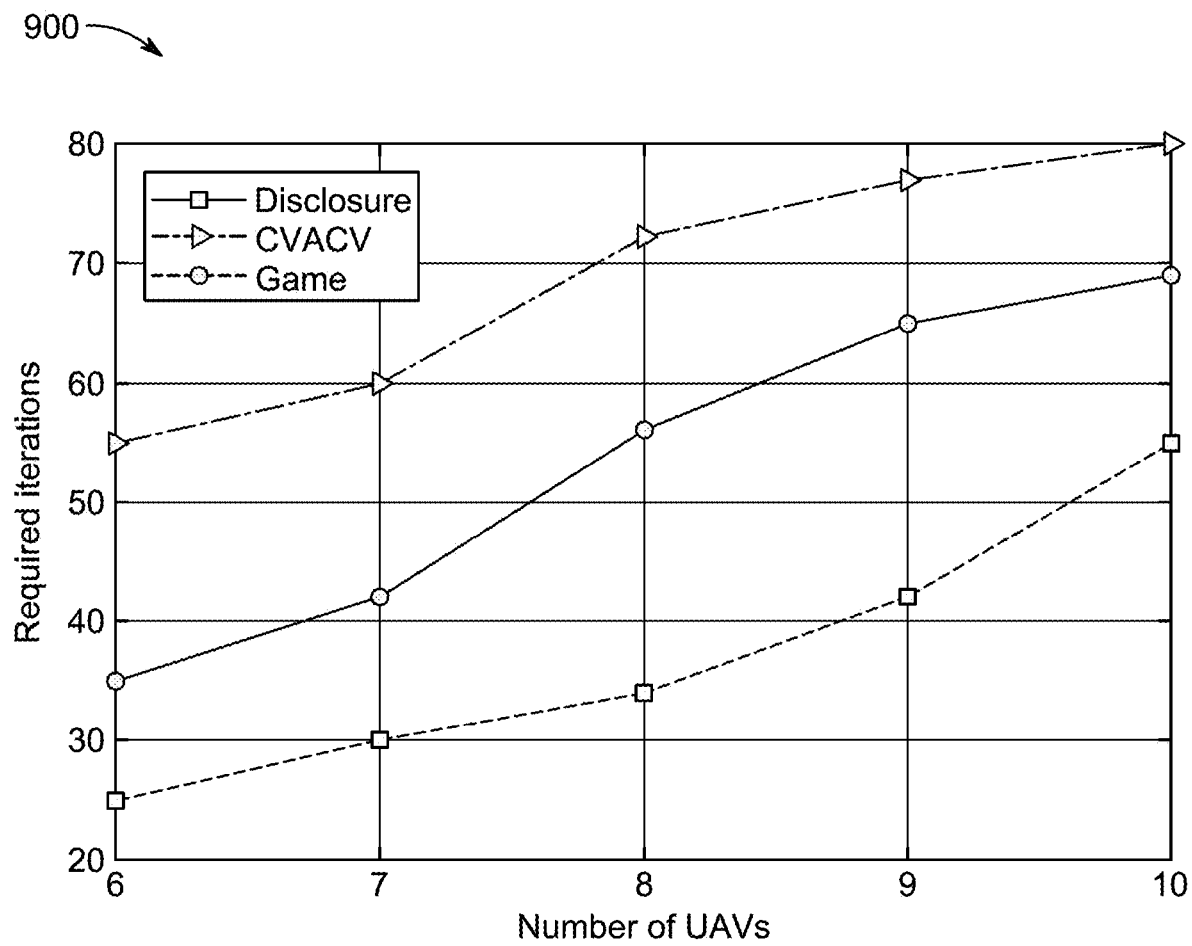
FIG. 9 illustrates a graphical representation of required iterations to reach the optimal coverage for the disclosed approach and both CVACA and game approaches, according to certain embodiments.

The iterations required for the determination approach of the current disclosure, as well as the CVACA and game-based methods, to achieve optimal coverage are presented in FIG. 9. The results indicate that the approach of the current disclosure requires fewer iterations to achieve optimal coverage, thereby demonstrating its superior efficiency.

Effect of Noise on RF Model Performance

Figure 10:
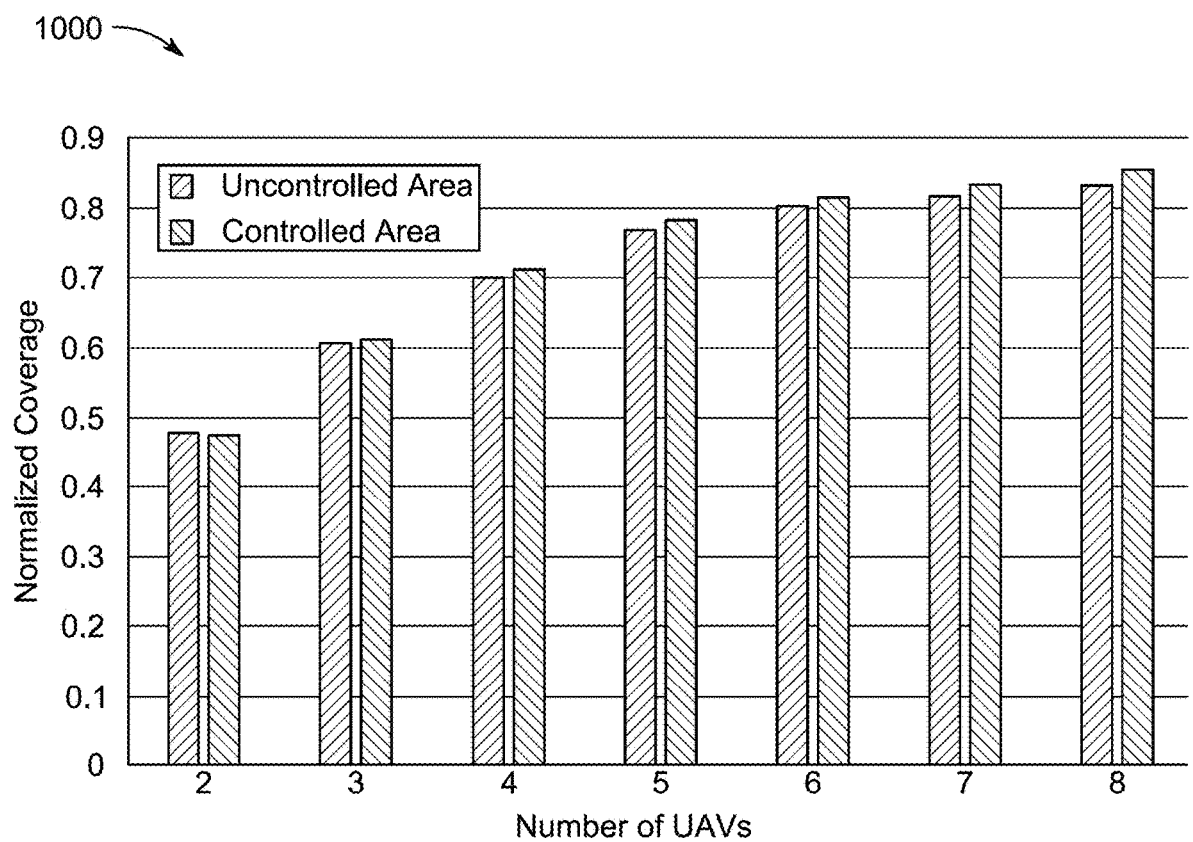
FIG. 10 illustrates a graphical representation of a normalized coverage with respect to number of UAVs for different noise power in range −120 to −90 dBm, according to certain embodiments.
Figure 11:
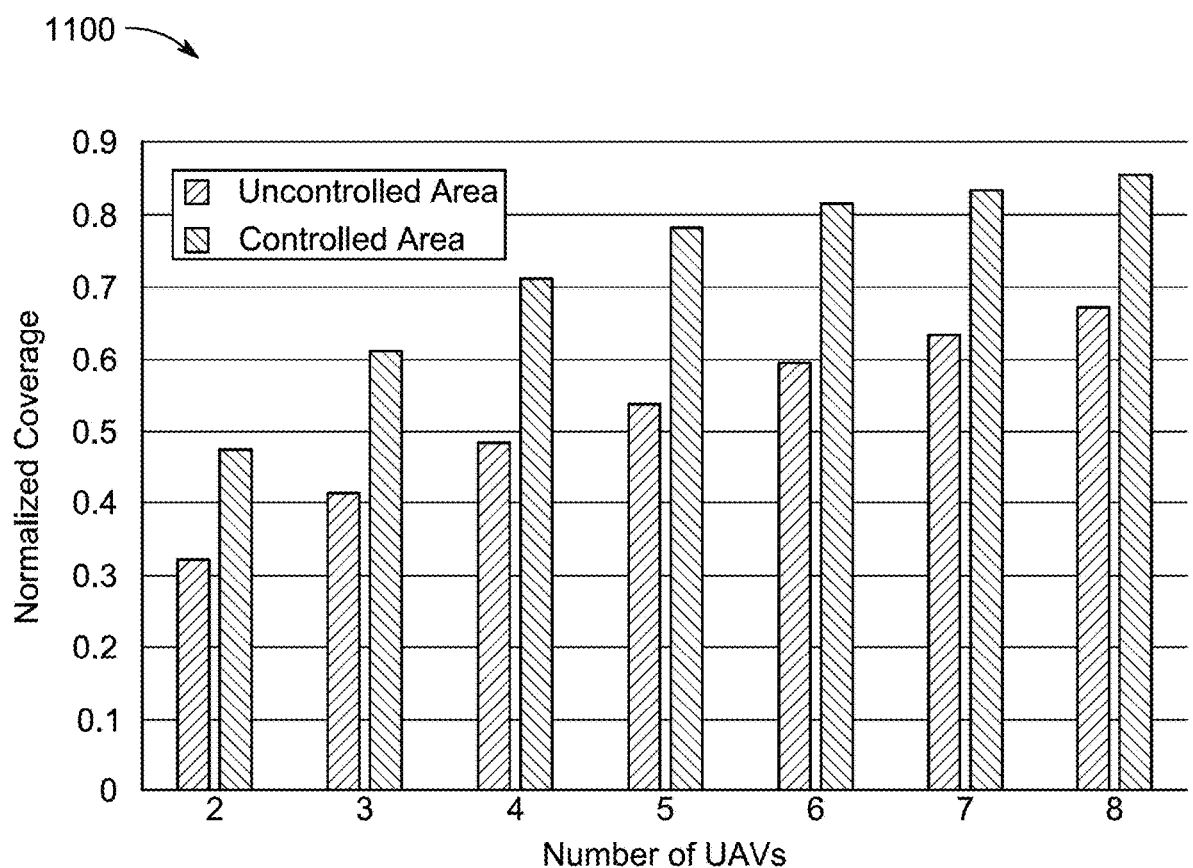
FIG. 11 illustrates a graphical representation of a normalized coverage with respect to number of UAVs for different noise power in range −90 to −70 dBm, according to certain embodiments.

The RF model is evaluated for its robustness by analyzing performance of the RF model under two defined noise ranges. The first range spans from −120 dBm to −90 dBm, while the second range extends from −90 dBm to −70 dBm. The analysis is conducted for varying quantities of UAVs, and the results are presented in a graphical representation of 1000, and 1100 in FIGS. 10 and 11, corresponding to the respective noise ranges.

The normalized coverage achieved by the RF model is examined as a function of the number of UAVs for both controlled and uncontrolled environments under varying noise power levels. The results demonstrate that the RF model exhibits significant robustness when subjected to noise levels within the first range (−120 dBm to −90 dBm). The noise levels in the first range have minimal impact on the performance of the RF model, maintaining consistent normalized coverage in both controlled and uncontrolled conditions.

However, as the noise levels escalate to the second range (−90 dBm to −70 dBm), a noticeable degradation in the performance of the RF model is observed. The elevated noise levels within this range substantially reduce the normalized coverage. The findings confirm that noise in the second range exerts a significant adverse effect on the performance of the RF model, highlighting its sensitivity to higher noise levels. Accordingly, the results underscore the necessity of accounting for noise variations to ensure the reliable operation of the RF model in environments with elevated noise power levels.

The present disclosure outlines an optimization approach leveraging an Improved Particle Swarm Optimization (IPSO) algorithm, which demonstrates superior efficacy in maximizing coverage areas when compared to game-based and non-game-based methods. The disclosed approach surpasses these conventional methodologies due to its ability to efficiently and effectively explore the search space. The IPSO algorithm integrates the advantages of swarm intelligence with optimization techniques to locate optimal solutions within the search domain. Unlike game-theoretic approaches, which involve strategic interactions among multiple entities, the IPSO methodology prioritizes determining the optimal solution without the computational complexity associated with such interactions. Although game-theoretic methods can model competition and cooperation, they are computationally intensive and may fail to achieve globally optimal outcomes.

The CVACA method, while designed to maximize the sensing radius for individual UAVs and mitigate overlap with neighbouring UAVs, exhibits limitations as the network size increases. Specifically, in smaller-scale networks, the objective of avoiding overlap is readily achievable. However, as the number of UAVs grows, the overlapping regions expand correspondingly, necessitating a significantly greater number of iterations to determine coverage without overlap. The disclosed determination approach effectively addresses these challenges and achieves superior results under varying network sizes.

This disclosure presents an autonomous decision-making framework built upon a robust determination strategy. The disclosed approach efficiently deploys UAVs within an Internet of Drones (IoD) network to the most suitable locations, thereby maximizing overall coverage while minimizing interference among UAVs. The determination framework incorporates all critical parameters of the Radio Frequency (RF) model, specifically evaluating Line-of-Sight (LOS) and Non-Line-of-Sight (NLOS) downlink coverage probabilities for UAV-to-ground communication.

The methodology of the current disclosure has been validated through both mathematical modeling and simulation experiments. Simulation results confirm that the approach exhibits rapid convergence and achieves maximum coverage with minimized power consumption by leveraging the RF model and altitude parameters. Comparative analyses further establish that the disclosed determination approach outperforms CVACA and game-based methodologies. Specifically, the method of the current disclosure provides enhanced coverage, optimally deploys IoD networks, and achieves faster convergence with fewer iterations required to reach optimal coverage.

Future extensions of the disclosed framework will investigate the influence of varying antenna configurations on coverage performance. Additionally, weather conditions, regulatory constraints, and hardware limitations will be considered to assess their impact on the cooperative UAV network. Furthermore, energy consumption metrics for the UAV-assisted network, as facilitated by the disclosed determination strategy, can also be determined.

Next, further details of the hardware description of the computing environment of FIG. 1 according to exemplary embodiments is described with reference to FIG. 12.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skilled in the art would recognize. Further, CPU 1201, 1203 may be implemented as multiple processors cooperatively working in parallel to perform the instructions of the inventive processes described above.

Figure 12:
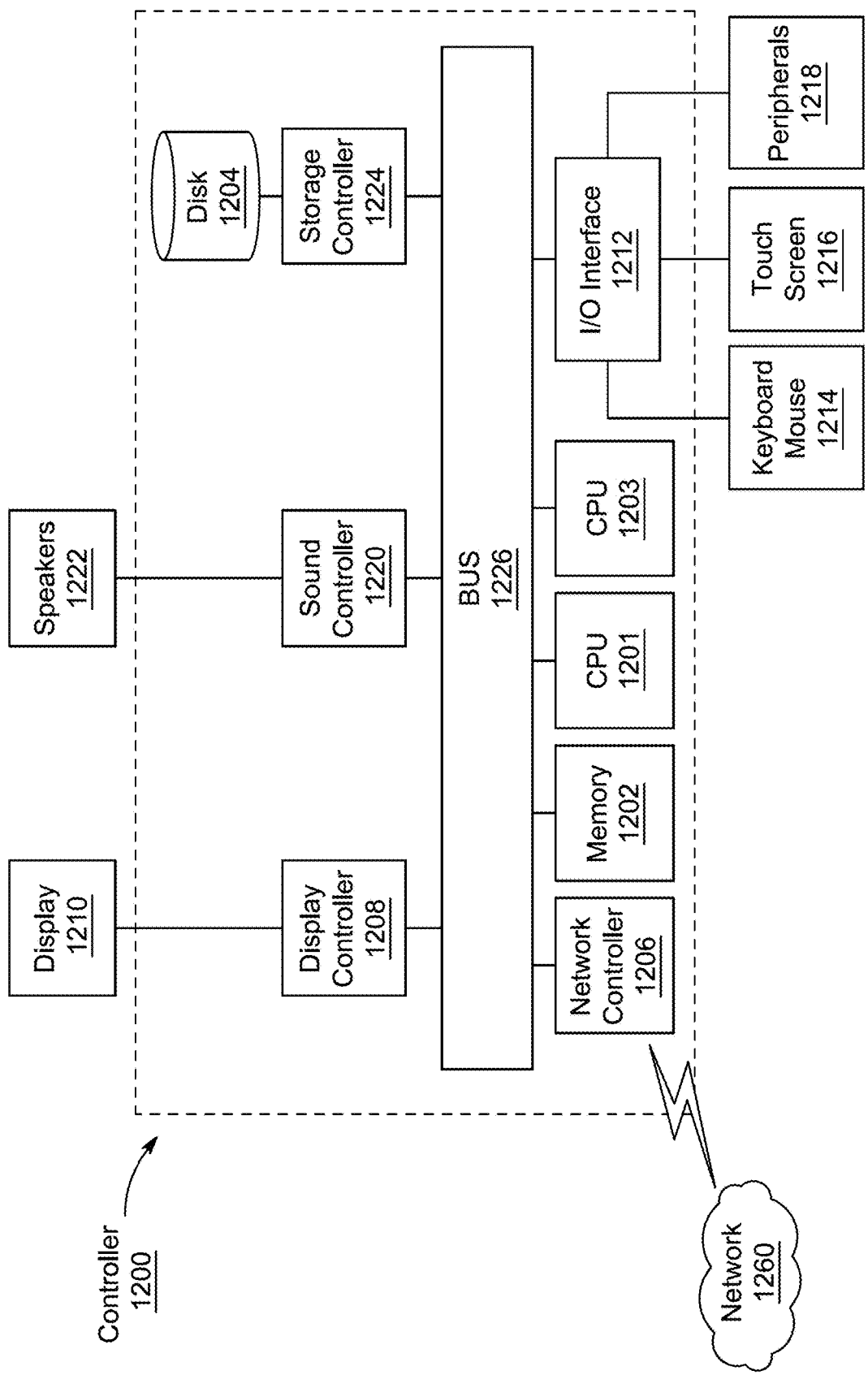
FIG. 12 is an illustration of a non-limiting example of details of computing hardware used in a computing system, according to certain embodiments.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1318 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general-purpose storage controller 1224 connects the storage medium disk 1304 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 13:
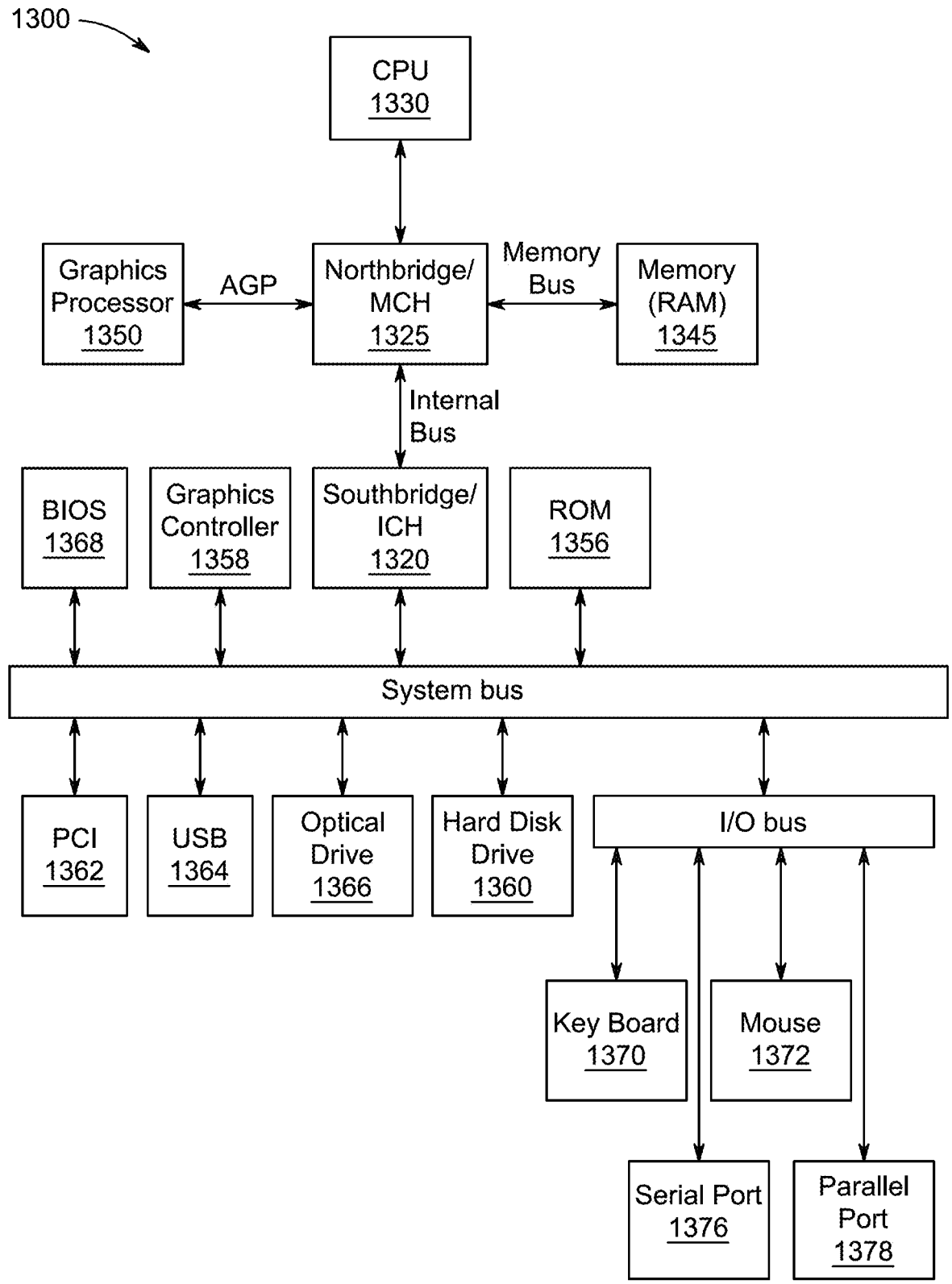
FIG. 13 is an exemplary schematic diagram of a data processing system used within the computing system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
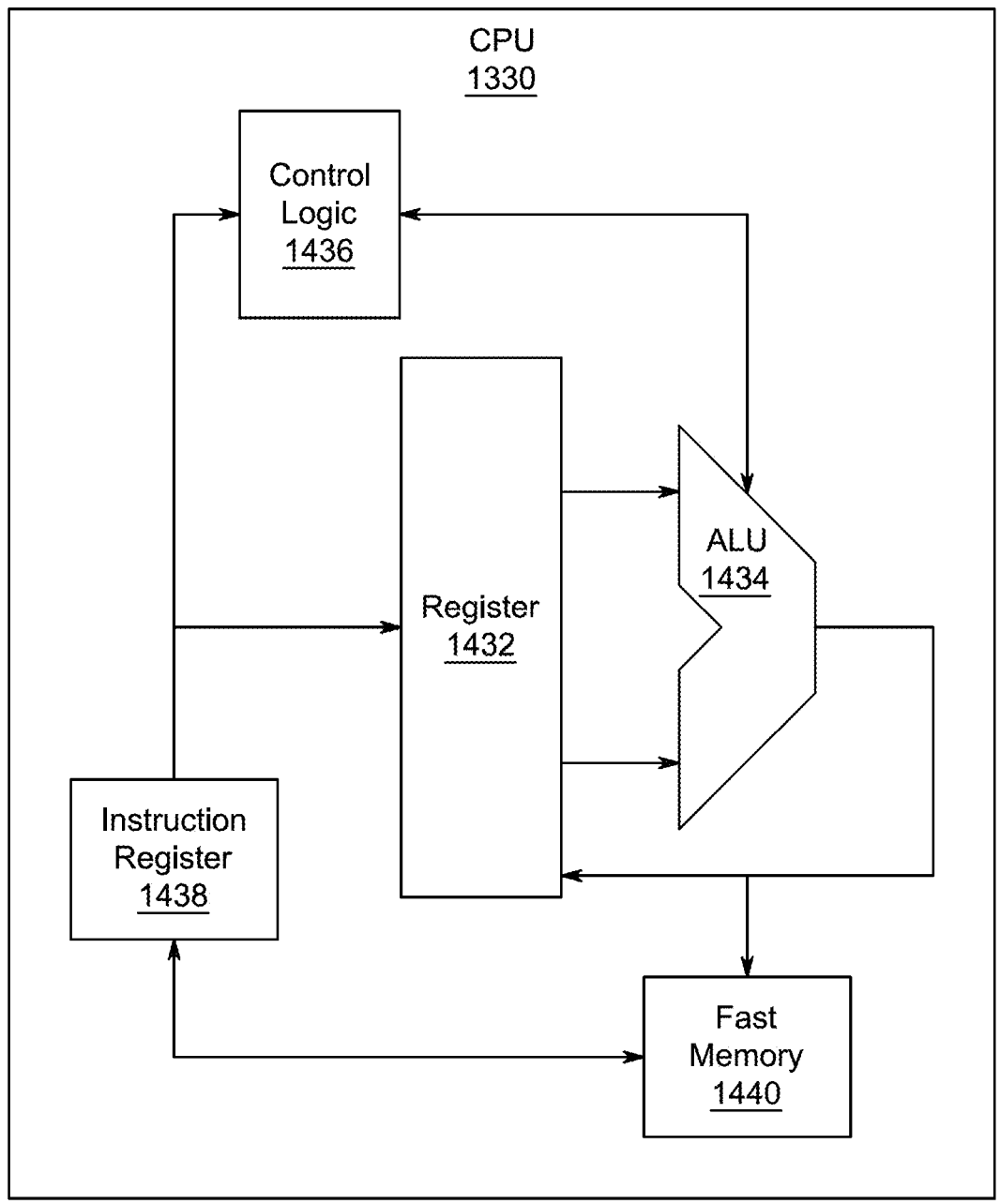
FIG. 14 is an exemplary schematic diagram of a processor used with the computing system, according to certain embodiments.

For example, FIG. 14 shows one implementation of CPU 1330. In one implementation, the instruction register 1432 retrieves instructions from the fast memory 1440. At least part of these instructions is fetched from the instruction register 1432 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x56 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 1320 through a PCI bus 1362.

The PCI devices may include, for example, Ethernet adapters, add-in cards, and PC cards for notebook computers. The Hard disk drive 1360 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 15:
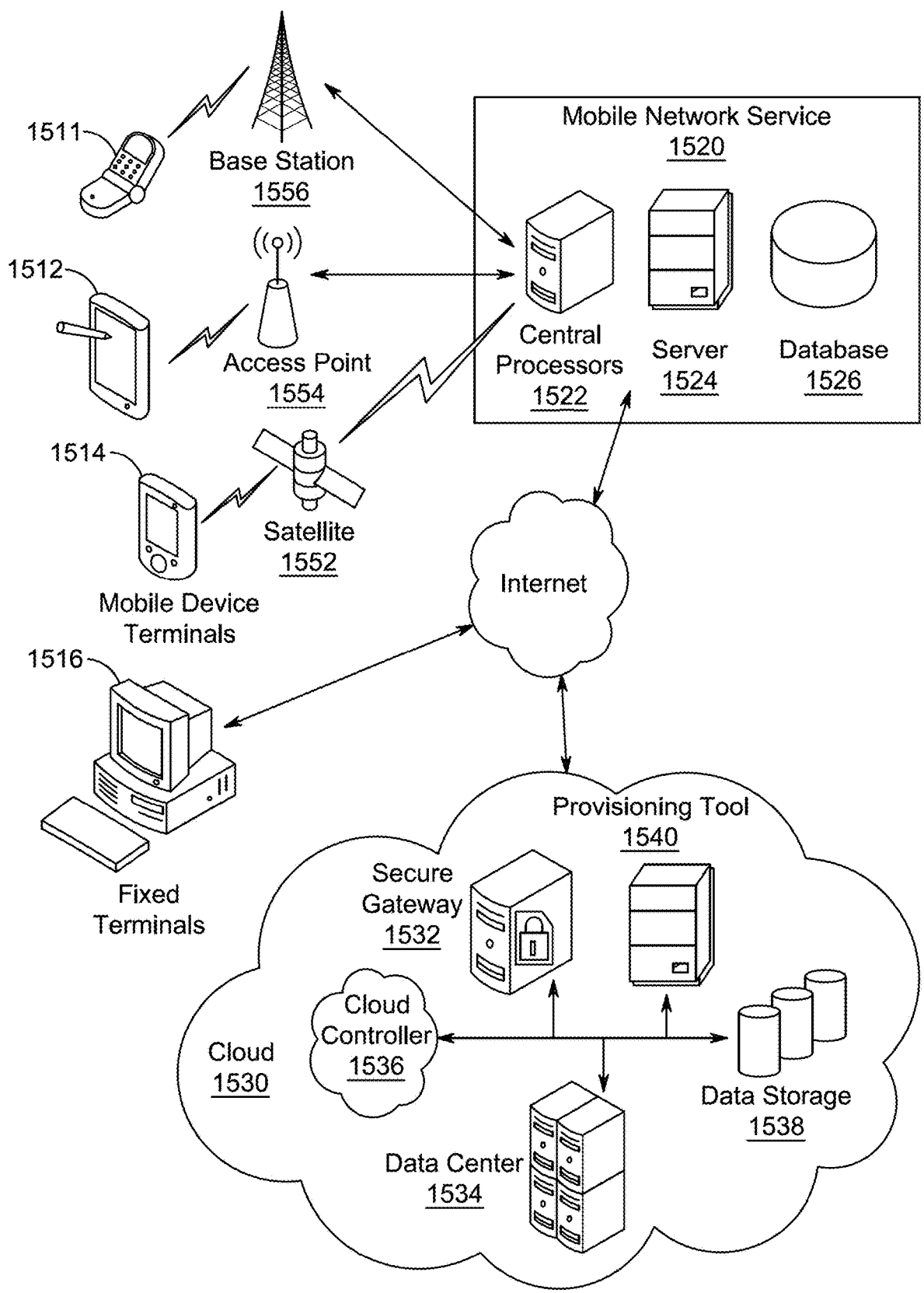
FIG. 15 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 15, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 15 illustrates client devices including smart phone 1511, tablet 1512, mobile device terminal 1514 and fixed terminals 1516. These client devices may be commutatively coupled with a mobile network service 1520 via base station 1556, access point 1554, satellite 1552 or via an internet connection. Mobile network service 1520 may comprise central processors 1522, server 1524 and database 1526. Fixed terminals 1516 and mobile network service 1520 may be commutatively coupled via an internet connection to functions in cloud 1530 that may comprise security gateway 1532, data center 1534, cloud controller 1536, data storage 1538 and provisioning tool 1540.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of simultaneously maximizing a coverage and minimizing an interference of an internet of drones (IoD) network including a plurality of drones, comprising:
obtaining a plurality of input parameters including radio frequency parameters, including a beam angle of an antenna of each drone of the plurality of drones, a number of antennae for each drone of the plurality of drones, and a carrier frequency,
a location of the each drone of the plurality of drones,
a velocity of the each drone of the plurality of drones,
a coverage area, and
a number of drones of the plurality of drones, wherein the plurality of input parameters is initialized based on an input condition;
determining a first interference and a first coverage based on the plurality of input parameters using a radio frequency-based multi-objective model;
updating the plurality of input parameters to obtain a plurality of updated parameters;
determining a second interference and a second coverage based on the plurality of updated parameters and the radio frequency-based multi-objective model;
determining a best coverage by comparing the first coverage and the second coverage and a best interference by comparing the first interference and the second interference; and
iterating the updating, the determining an updated interference and an updated coverage, and the determining the best coverage and the best interference by a predetermined time to determine a best location of the each drone of the plurality of drones with the best coverage and the best interference,
wherein the determining the second coverage comprises:
determining the second interference of the IoD network based on the plurality of input parameters;
determining a coverage probability based on the second interference;
determining a plurality of block coverages based on the coverage probability; and
determining the second coverage based on the plurality of block coverages.

2. The method of claim 1, wherein the each drone of the plurality of drones includes a fixed beam directional antenna.

3. The method of claim 2, wherein the fixed beam directional antenna is configured for a line-of-sight propagation and a non-line of sight propagation.

4. The method of claim 3, wherein the determined first coverage is based on the line-of-sight propagation and the non-line of sight propagation.

5. The method of claim 1, wherein the plurality of input parameters includes an altitude of the each drone of the plurality of drones.

6. The method of claim 5, further comprising adjusting the altitude of the each drone of the plurality of drones to adjust the line-of-sight propagation and the non-line of sight propagation.

7. The method of claim 1, wherein the plurality of input parameters further includes a weather condition, a regulatory constraint, and an energy consumption of the plurality of drones.

8. The method of claim 1, further comprising deploying the plurality of drones at the determined best location of the each drone of the plurality of drones.

9. The method of claim 1, further comprising adjusting a beamwidth of the antenna to adjust the first coverage.

10. The method of claim 1, further comprising adjusting an orientation of the antenna to adjust the first coverage.

11. The method of claim 1, wherein the plurality of input parameters further includes terrain elevation, building density, and vegetation attenuation.

12. The method of claim 1, further comprising performing a simulation to assess a deployment of the plurality of drones at the determined best location of the each drone of the plurality of drones.

13. The method of claim 12, further comprising repeating the iterating the updating, the determining an updated interference and an updated coverage, and the determining the best coverage and the best interference upon determining, based on the simulation, the deployment of the plurality of drones at the determined best location of the each drone of the plurality of drones does not provide the best coverage above a predetermined threshold.

14. The method of claim 13, wherein the predetermined threshold is an alternative coverage determined using a game-based strategy.

15. The method of claim 13, wherein the predetermined threshold is an alternative coverage determined using a Collaborative Visual Area Coverage Approach (CVACA).

16. The method of claim 1, further comprising adjusting a transmission power of the each drone of the plurality of drones based on the determined first interference.

17. The method of claim 16, wherein the adjusting the transmission power of the each drone of the plurality of drones based on the determined first interference reduces the best interference of the each drone of the plurality of drones.

18. The method of claim 1, wherein the determined best location of the each drone of the plurality of drones maximizes a horizontal separation distance between the each drone of the plurality of drones.

19. The method of claim 1, wherein the plurality of input parameters further includes a number of cells and a cell size, and the method further comprises maximizing the best coverage per cell based on the number of cells and the cell size.

* * * * *